United States Patent [19]
Koleske et al.

[11] 3,770,564
[45] Nov. 6, 1973

[54] COMPOSITE ARTICLE HAVING A HEAT-ACTIVATABLE BODY

[75] Inventors: Joseph Victor Koleske, Charleston, W. Va.; Robert Dean Lundberg, Somerville, N.J.; Dale Flavian Pollart, Charleston, W. Va.; Walter Henry Smarook, Somerville, N.J.

[73] Assignee: Union Carbide Corporation, New York, N.Y.

[22] Filed: June 3, 1971

[21] Appl. No.: 149,829

Related U.S. Application Data
[62] Division of Ser. No. 812,320, April 1, 1969, Pat. No. 3,641,204.

[52] U.S. Cl................. 161/183, 161/88, 161/182, 161/184, 161/190, 161/192, 161/226, 161/227, 161/239, 161/231, 161/247, 161/255, 161/256, 161/257, 161/270
[51] Int. Cl.............................................. B32b 9/04
[58] Field of Search................... 161/182, 192, 226, 161/227, 190, 239, 247, 257, 184, 183, 231, 270, 88, 256, 255; 260/78.3 R

[56] References Cited
UNITED STATES PATENTS

| | | | |
|---|---|---|---|
| 2,697,084 | 12/1954 | Eger.................................. | 260/874 |
| 3,021,311 | 2/1962 | Cox et al.......................... | 260/78.3 R |
| 3,523,920 | 8/1970 | Schultz............................ | 260/78.3 R |

*Primary Examiner*—Cameron K. Weiffenbach
*Attorney*—Paul A. Rose, Aldo John Cozzi and Francis M. Fazio

[57] ABSTRACT

Composite articles having at least one solid substrate of such diverse nature as glass, leather, cellulosic solids (including wood, paper, cotton and cellulose derivatives), polyamide solids, polyurethane solids, natural rubber solids, synthetic rubber solids, phenolic resin solids, epoxy resin solids, styrene polymer and copolymer solids and the like, bonded to an adhesive body which is anti-blocking (non-tacky) at ambient temperature but is heat activatable at relatively moderate temperature as low as 60° C. to provide excellent bonding upon cooling to ambient temperatures, and which comprises a cyclic ester polymer having recurring units of the formula:

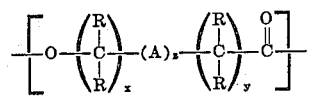

wherein each R, individually, is selected from the class consisting of hydrogen, alkyl, halo, and alkoxy; A is the oxy group; $x$ is an integer from 1 to 4; $y$ is an integer from 1 to 4; $z$ is an integer of zero or one; which the provisos that (a) the sum of $x + y + z$ is at least 4 and not greater than 7, and (b) the total number of R variables which are substituents other than hydrogen does not exceed 3, with or without recurring units of the formula:

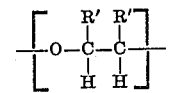

wherein each R' is selected from the class consisting of, individually, hydrogen, alkyl, cycloalkyl, aryl, and chloroalkyl, and, together with the ethylene moiety of the oxyethylene chain of Unit II, a saturated cycloaliphatic hydrocarbon ring having 4 to 8 carbon atoms. Also novel adhesive compositions containing the above-described cyclic ester polymer and vinyl alkyl ethers in the form of solutions, dispersions, powders, films, coatings and granules or pellets. The invention is applicable to adhering a broad range of diverse types of substrates without the necessity of using high temperatures or long setting times or toxic materials. It is also applicable to the production of heat activatable coatings or seals for diverse packaging materials, laminating uses, construction uses, investment molding type castings, and repair uses.

14 Claims, No Drawings

COMPOSITE ARTICLE HAVING A HEAT-ACTIVATABLE BODY

CROSS REFERENCE TO A RELATED APPLICATION

This application is a division of Ser. No. 812,320, filed Apr. 1, 1969, now U.S. Pat. No. 3,641,204.

BACKGROUND OF THE INVENTION a. Field of the Invention

The present invention relates to novel composite articles comprising solid substrates of diverse types bonded to adhesive compositions which are heat-activatable at relatively moderate temperatures and to novel heat-activatable adhesive compositions for use therein. More particularly, the invention relates to composite articles of one or more solid substrates, or layers of solid substrates, each bonded to the heat activatable adhesive composition which contain a cyclic ester polymer as an adhesive component and to novel heat-activatable adhesive compositions containing cyclic ester polymers and poly(vinyl alkyl ether).

b. Description of the Prior Art

There are a great many adhesives known in the prior art. There are several basic types including the monomeric adhesives which must be catalyzed to produce a strong bond, solvent adhesives which contain dissolved plastic and depend upon evaporation to form the bond, bodied adhesives which contain thermoplastic or thermosetting resins and solvents with or without plasticizers and require evaporation of solvent to form a strong bond, elastomeric adhesives based on natural and synthetic rubbers and depending on the evaporation of solvent to form a strong bond, 100 percent reactive adhesives such as the epoxies or phenolics which depend upon a catalytic reaction to effect a strong bond, and heat-activatable adhesives such as thermoplastics, e.g., poly(vinyl butyral), which are softened or melted when heated and form strong bonds when cooled.

SUMMARY OF THE INVENTION

This invention is directed to novel composite articles formed of at least one solid substrate bonded to a heat-activatable adhesive composition which is non-tacky and anti-blocking at ambient temperatures of normal use, yet are activatable by heating to moderate temperatures, e.g., as low as 60° C., to form strong, tough bonds with diverse solid substrates when cooled to ambient temperatures. The invention is also directed to novel adhesive compositions suitable for forming the above-mentioned composite articles. The adhesive compositions used in the production of such composite articles can be in the form of powders, solutions, dispersions, melts, films, tapes, sheets, granules or pellets and the specific form is dependent on convenience for a particular use and is subject to the choice of the user.

The adhesive compositions used herein can be coated onto the surface of a solid substrate by a variety of methods as will be described in detail hereinafter to form a heat-activatable coating. The coatings so formed are anti-blocking and can be contacted with each other under pressure at ambient temperatures for extended periods of time without adhering to each other. Similarly the solid forms, i.e., powders, granules, pellets, tapes, sheets and films, of the adhesive compositions can be pressure contacted with each other over long periods at ambient temperatures without adhering to each other. Nonetheless, upon heating to moderate temperatures and pressure contacting with a solid substrate, strong, tough adhesive bonds are formed after cooling. These characteristics of the present invention greatly simplify the shipment, storage and handling of the composite articles and adhesive compositions disclosed herein.

The adhesive compositions in the solid forms as listed above or as bonded to one or more solid substrates are further characterized by a high degree of creep resistance at ambient temperatures and this characteristic is highly important in the shipment, storage and handling of the adhesive compositions as well as in the service use of the composite articles.

Diverse solid substrates can be bonded to the adhesive composition in the practice of this invention including cellulosic solids, such as wood, including plywood; paper, both filled and unfilled; cellulosic fibers, fabrics (knitted, woven and non-woven) and textile products including garments, sheets, pillowcases, draperies, curtains, upholstery and the like, made of cotton, rayon, blends of cotton and rayon, blends of cotton or rayon with synthetic fibers, such as, poly(ethylene terephthalate) fibers, polyacrylonitrile fibres, nylon fibers and the like, cellulose derivatives such as solid nitrocellulose, solid cellulose ethers, including ethyl cellulose, methyl cellulose, hydroxy ethyl cellulose, carboxy methyl cellulose, solid cellulose esters, such as cellulose acetate, cellulose decanoates and the like, glass of all types; leather; other natural and synthetic fibers, fabrics (knitted, woven or non-woven) and textile prodcuts made of wool fibers, nylon fibers, poly(ethylene terephthalate) fibers, polyacrylonitrile fibers and blends of two or more such fibers, polypeptides, nylons, thermoplastic polyurethanes, polyesters of polycarboxylic acids and polyhydric alcohols, preferably dicarboxylic acids and dihydric alcohols, the normally solid acrylic polymers and copolymers, such as, poly(methyl methacrylate), poly(ethyl methacrylate), poly(acrylonitrile) and those described on pages 133 and 138 of Modern Plastics Encyclopedia, 1964 and references cited therein, polycarbonates; polysulfones, styrene polymers and copolymers, such as polystyrene, styrene-acrylonitrile copolymers, styrene-methyl methacrylate popolymers; polymers and copolymers of olefinically unsaturated carboxylic acids and anhydrides; elastomers, such as natural rubber and synthetic rubbers including butyl rubber, nitrile rubber, polybutadiene rubber, polyisobutylene rubbers, acrylonitrile-butadiene-styrene rubbers, ethylene-propylene terpolymer rubbers, and silicone rubbers; phenolic resins, thermoset polyurethanes, epoxy resins, melamine resins, polyureas, urea formaldehyde condensates; and painted, enameled or lacquered surfaces. No special treatments of the solid substrates are necessary, their surfaces should only be reasonably clean and free of dirt, oil or other comtaminants.

The cyclic ester polymers which are contemplated in the practice of the invention are those which possess a reduced viscosity value of at least about 0.3 to about 15, and higher. The preferred polymers of cyclic esters for many applications have a reduced viscosity value of from about 0.5 to about 10. These polymers are further characterized by the following recurring structural linear Unit I:

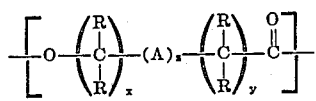

wherein each R, individually, is selected from the class consisting of hydrogen, alkyl, halo, and alkoxy; A is the oxy group; $x$ is an integer from 1 to 4; $y$ is an integer from 1 to 4; $z$ is an integer of zero or one; with the provisos that (a) the sume of $x + y + z$ is at least 4 and not greater than 7, and (b) the total number of R variables which are substituents other than hydrogen does not exceed 3, preferably does not exceed 2, per unit. Illustrative R variables include methyl, ethyl, isopropyl, n-butyl, sec-butyl, t-butyl, hexyl, chloro, bromo, iodo, methoxy, ethoxy, n-butoxy, n-hexoxy, 2-ethylhexoxy, dodecoxy, and the like. It is preferred that each R, individually, be hydrogen, lower alkyl, e.g., methyl, ethyl, n-propyl, isobutyl, and/or lower alkoxy, e.g., methoxy, ethoxy, propoxy, n-butoxy, and the like. It is further preferred that the total number of carbon atoms in the R substituents does not exceed twenty.

In one embodiment, highly desirable cyclic ester polymers which are contemplated are characterized by both recurring structural Unit I supra and recurring structural Unit II:

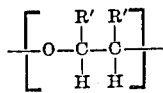

wherein each R' is selected from the class consisting of, individually, hydrogen, alkyl, cycloalkyl, aryl, and chloroalkyl, and, together with the ethylene moiety of the oxyethylene chain of Unit II, a saturated cycloaliphatic hydro-carbon ring having from 4 to 8 carbon atoms, desirably from 5 to 6 carbon atoms. It is preferred that recurring Unit II contains from 2 to 12 carbon atoms. Illustrative R' variables include methyl, ethyl, n-propyl, isopropyl, t-butyl, the hexyls, the dodecyls, 2-chloroethyl phenyl, phenethyl, ethylphenyl cyclopentyl, cyclohexyl, cycloheptyl, and the like. It is preferred that R' be hydrogen; lower alkyl, e.g., methyl, ethyl, n-propyl, isopropyl; chloroalkyl, e.g., 2-chloroethyl and the like.

The aforedescribed recurring linear Unit (I) is interconnected through the oxy group (—O—) of one unit with the carbonyl group

of a second unit. In different language, the interconnection of these units does not involve the direct bonding of two carbonyl groups, i.e.,

With relation to the relatively high molecular weight cyclic ester polymers, the terminal moieties thereof are not determinable by infra-red analysis which factor is readily understandable since macromolecules are involved. On the other hand, the relatively lower molecular weight cyclic ester polymers, e.g., those having reduced viscosity values below about 0.25 are characterized by end groups which can be hydroxyl; carboxyl, hydrocarbyl such as alkyl, cycloalkyl, aryl, aralkyl, and alkaryl; hydrocarbyloxy such as alkoxy, cycloalkoxy, aryloxy, aralkoxy, and alkaryloxy; and possibly other moieties such as catalyst residue; and mixtures of the foregoing. It may be desirable in certain instances that the hydroxyl and carboxyl end groups, if present, be esterified or acylated to render them inert such as by reacting the hydroxyl moiety with a monocarboxyl compound or its corresponding anhydride, e.g., acetic acid, acetic anhydride, butyric acid, 2-ethylhexanoic acid, benzoic acid, etc., or by reacting the carboxyl moiety with a monohydroxyl compound such as as a monohydric alcohol or monohydric phenol, e.g., methanol, 2-ethylhexanol, isobutanol, phenol, and the like.

When the cyclic ester polymers are prepared from a mixture containing the cyclic ester monomer and minor amounts of a cyclic ether which is copolymerizable therewith, e.g., alkylene oxide, oxetane, tetrahydrofuran, etc., the polymeric chain of the resulting copolymeric product will be characterized by both recurring linear Unit I supra as well as the recurring linear Unit II which would represent the alkylene oxide comonomer polymerized therewith. When the comonomer is an alkylene oxide, then the resulting copolymeric product will contain both recurring linear Unit I and recurring linear Unit II in the copolymeric chain thereof. The interconnection of linear Unit I and linear Unit II supra does not involve or result in the direct bonding of two oxy groups, i.e., —O—O—. In other words, the oxy group (—O—) of recurring linear Unit II is interconnected with the carbonyl group

of recurring linear Unit I supra or with the alkylene moiety of a second oxyalkylene Unit (II).

Particularly preferred polymers of cyclic esters are those which are characterized by the oxypentamethylenecarbonyl chain as seen in recurring structural Unit III:

(III)

wherein each $R_1$ is hydrogen or lower alkyl, preferably hydrogen or methyl, with the proviso that no more than three $R_1$ variables are substituents other than hydrogen.

The preparation of the cyclic ester polymers are well documented in the patent literature as exemplified by U. S. Pat. Nos. 3,021,309 through 3,021,317; 3,169,945; 3,274,123; 3,305,605; 3,324,070 and 2,962,524 and Canadian Pat. No. 742,294. Briefly, the process involves the polymerization of an admixture containing at least one cyclic ester monomer with or without a functional (e.g., active hydrogen-containing) initiator therefor, and a suitable catalyst, the choice of which will depend on the presence or absence of added initiator.

Suitable monomeric cyclic esters which can be employed in the manufacutre of the cyclic ester pooymers are best illustrated by the following formula:

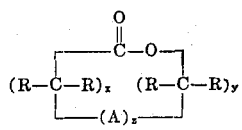

wherein the R, A, x, y, and z variables have the significance noted in Unit I supra.

Representative monomeric cyclic esters which are contemplated include, for example, delta-valerolactone; epsilon-caprolactone; zeta-enantholactone; eta-caprylolactone; the monoalkyl-delta-valerolactones, e.g., the monomethyl-, monoethyl-, monohexyl-, delta-valerolactones, and the like; the dialkyl-delta-valerolactones, e.g., the dimethyl-, diethyl-, and di-n-octyl-delta-valerolactones, and the like; the monoalkyl-dialkyl-, and tri-alkyl-epsilon-caprolactones, e.g., the monomethyl-, monoethyl-, monohexyl-, dimethyl-, diethyl-, di-n-propyl di-n-hexyl-, trimethyl-, triethyl-, and tri-n-propyl-epsilon-caprolactones, and the like; the monoalkoxy- and dialkoxy-delta-valerolactones and epsilon-caprolactones, e.g., the monomethoxy-, monoisopropoxy-, dimethoxy-, and diethyoxy-delta-valerolactones and epsilon-caprolactones, and the like; 1,4-dioxane-2-one, dimethyl-1,4-dioxane-2-one; and the like. A single cyclic ester monomer or mixtures of such monomers may be employed.

In the absence of added functional initiator, and polymerization process is desirably effected under the operative conditions and in the presence of anionic catalysts as noted in U. S. Pat. Nos. 3,201,309 to 3,021,317 such as dialkylzinc, dialkylmagnesium, dialkylcadmium, trialkylaluminum, dialkylaluminum alkoxide, alkylaluminum dialkoxide, dialkylaluminum halide, aluminum trialkoxide, alkyllithium, and aryllithium. Specific anionic catalysts would include di-n-butylzinc, diethylmagnesium, di-n-butylmagnesium, dimethylcadmium, diethylcadmium, di-t-butylcadmium, triethylaluminum, triisobutylaluminum, tri-2-ethylhexylaluminum, aluminum triisopropoxide, aluminum triethoxide, ethyllithium, n-butyllithium, phenyllithium, and the like.

When employing an admixture containing cyclic ester monomer and functional initiator which possesses at least one active hydrogen substituent, e.g., amino, carobxyl, and hydroxyl, it is desirable to use the catalysts noted in U. S. Pat. Nos. 2,878,236, 2,890,208, 3,169,945, and 3,284,417 under the operative conditions discussed therein. In these processes the active hydrogen substituent on the initiator is capable of opening the monomer cyclic ester ring whereby said cyclic ester is added to said initiator as a substantially linear group thereto. The molecular weight of the resulting polymers of cyclic ester can be predetermined by controlling the molar ratios of cyclic ester monomer to be added to the functional initiator. Amino and hydroxyl substituents on the initiator will result in polymeric products having hydroxyl end-group. Carboxyl substituents on the initiator will result in polymeric products having carboxyl end-groups. The initiator with the active hydrogen atom will thus be contained in the final polymeric molecule. The esterification or acylation of the aforementioned end-groups has been described previously and is voluminuously documented in the art.

Polymers of cyclic esters can also be manufactured via the process described in U.S. Pat. No. 2,962,524. In this process, a monomeric admixture comprising cyclic ester and alkylene oxide which desirably has the formula:

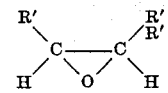

wherein each R', individually, have the meanings noted in Unit II supra, can be reacted with a monofunctional and/or polyfunctional (e.g., active hydrogen-containing) initiator possessing amino, hydroxyl and/or carboxyl groups, preferably in the presence of a Lewis acid catalyst such as boron trifluoride. Illustrative alkylene oxides would include ethylene oxide, propylene oxide, the butylene oxides, styrene oxide, epichlorohydrin, cyclohexene oxide, and the like.

Cyclic ester/alkylene oxide copolymers can also be prepared by reacting in the absence of an active hydrogen-containing initiator an admixture comprising cyclic ester and alkylene oxide monomers, an interfacial agent such as a solid, relatively high molecular weight poly(vinyl stearate) or lauryl methacrylate/vinyl chloride copolymer (reduced viscosity in cyclohexanone at 30° C. of from about 0.3 to about 1.0), in the presence of an inert normally-liquid saturated aliphatic hydrocarbon vehicle such as heptane, phosphorus pentafluoride as the catalyst therefor, at an elevated temperature, e.g., about 80° C., and for a period of time sufficient to produce such cyclic ester/alkylene oxide copolymers.

The cyclic ester polymers employed herein contain in the polymeric chain greater than 50, preferably about 80, to about 100 mol percent of Units I and about 0 to less than about 50, preferably about 20, mol percent of other units such as alkylene oxide Units II, initiator residues or moieties, catalyst residues, and other difunctional and/or mono-functional units. The cyclic ester polymers containing about 100 mol percent of unit I are preferred and those in which unit I represents the oxypentamethylene carbonyl moiety are most preferred.

As mentioned previously, the polymers of cyclic esters which are contemplated are expressed in terms of their reduced viscosity values. As is well known in the art, reduced viscosity value is a measure or indication of the molecular weight of polymers. The expression "reduced viscosity" is a value obtained by dividing the specific viscosity by the concentration of polymer in the solution, the concentration being measured in grams of polymer per 100 milliliters of solvent. The specific viscosity is obtained by dividing the difference between the viscosity of the solution and the viscosity of the solvent by the viscosity of the solvent. Unless otherwise noted, the reduced viscosity values herein referred to are measured at a concentration of 0.2 grams of polymer in 100 milliliters of benzene (benzene is preferred although cyclohexanone, chloroform, toluene or other organic solvent for the polymer may be used) at 30° C.

The cyclic ester polymer can be fluxed on a mill and sheeted off to form sheets or films. It can be extruded as a tape, rope, or other shape or can be extruded and pelletized. When formed by the dispersion polymerization technique, the cyclic ester polymer is obtained in powder or granular form. It can also be dissolved in a suitable solvent, such as, benzene, toluene, 2-nitropropane, methylene chloride and other solvents. Methylene chloride and other fast drying solvents are preferred when the cyclic ester is applied to the substrate as a solution. The cyclic ester polymer can be employed alone as the adhesive composition or can be intimately mixed with poly(vinyl alkyl ether) to form the adhesive composition.

Poly(vinyl alkyl ether) which may be employed in the adhesive compositions in this invention include poly(vinyl methyl ether), poly(vinyl ethyl ether), poly(vinyl isobutyl ether), poly(vinyl hexyl ether), poly(vinyl octyl ether) and the like. Preferably, such polymers contain no more than about eight carbon atoms in each alkyl group thereof and each poly-meric molecule can contain the same or different alkyl groups. The vinyl alkyl ether monomers are prepared in any well known manner as by the catalytic reaction of acetylene with an alkanol which contains the desired alkyl group.

The novel adhesive mixtures disclosed and claimed herein contain from about 10, to about 90, preferably about 80, percent of poly(vinyl alkyl ether) and about 90 to about 10, preferably about 20, percent of cyclic ester polymer, the percentages being based on the total weight of both polymers. When more than about 20 percent cyclic ester polymer is blended in the mixture, there is little if any tackiness and objects made from such blends do not adhere to themselves even when pressed together at ambient temperatures over extended periods. The presence of the cyclic ester polymer also has an advantageous effect on the creep resistance.

Any suitable method of preparing the adhesive mixtures can be used. For example, the cyclic ester polymer can be fluxed on a two-roll mill or in a suitable mixer by heating to moderate temperatures, e.g., 60°C. or more, and the poly(vinyl alkyl ether) can be added to it and mixing continued. After a substantially uniform blend has been obtained, the mixture can be sheeted, extruded in the form of tapes or ropes, extruded as a tubular film, extruded and pelletized in the conventional way, compresion molded into pellets, tablets, plaques or other desired shapes, or otherwise shaped or formed as desired.

In addition, powders or granules of the cyclic ester polymer can be sprayed with melts, solutions or dispersion of the poly(vinyl alkyl ether) and dried, if necessary, to provide relatively dry powders or granules. The cyclic ester polymer and poly(vinyl alkyl ether) can be dissolved in a common solvent and spread as a coating or film of mixed polymers and dried. Any method for bringing the two polymers into intimate contact can be used.

Maximum bonding temperatures are, of course, determined by the decomposition temperatures of the substrate or substrates and that of the adhesive composition. In substantially all instances in this invention, a wide margin of safety below these decomposition temperatures is available because of the moderate temperatures at which the adhesive composition is activated. The activation temperatures fall into the range of 60° to 200° C. and represent the temperature at which the particular adhesive composition employed becomes molten or soft enough to be deformed by pressure. Lower temperatures, e.g., as low as 60° or 80° C. are sufficient to cause bonding of the adhesive composition to itself, as for example, in its applications as heat shrinkable films and mending or repair tapes, described hereinafter.

The adhesive composition of cyclic ester polymer alone or mixed with poly(vinyl alkyl ether) can be applied and bonded to the solid substrate in any convenient manner. For example, a melt, solution or dispersion of the composition can be coated onto the substrate by spraying, brushing, rolling, extrusion, or flowing techniques and allowed to dry and/or cool. Alternatively, the adhesive composition in film form or powder, granular or pellet form can be spread on the substrate by any of the above-mentioned techniques and heated, while being compressed onto the substrate, if desired, to soften or melt the composition and then cooled to form a tough, strong bond between it and the substrate. The thus coated substrates are highly useful as heat bondable articles. For example, components to be assembled and fastened together into a finished structure can be manufactured and then coated in the above-described manner at different locations, and then assembled and heat-bonded together in the desired structure at a common assembly location. Additionally articles designed for attachment to fixed or immovable objects such as buildings or large objects such as vehicles or ships can be coated as described above and transported and attached to the object through the application of heat.

In bonding two or more substrates, as in the production of laminates, the second substrate is placed on the coating of the first substrate formed as described above. If the coating is dry and at ambient temperature, the substrates are preferably pressed toward each other and heated to at least 60° C., preferably 80° C., to melt or soften the adhesive composition and then cooled to form a strong, tough bond. If desired, the second substrate can be applied before drying and/or cooling of a freshly applied coating and pressed against the coating which is then allowed to cool and dry to form a tough, strong bond. Laminates of two sheets of glass bonded to an inter-layer of adhesive composition by the procedure disclosed herein are useful as shatter resistant glass.

When applied to cardboard, paper, Mylar film, polystyrene sheets and other packaging materials, the adhesive composition forms heat-activatable areas which can be formed in any patterns or configuration consistent with the desired package design. The poly(ethylene terephthalate) can be solvent precoated with this adhesive polymer to be heat-activated and post sealed at a later or subsequent bonding operation. Components or different areas of the package can thus be readily heat-sealed using conventional techniques. Films of the adhesive compositions containing the cyclic ester polymer alone or mixed with the poly(vinyl alkyl ether) are also useful in the packaging field as heat-shrinkabe films. These films are first oriented by stretching them near room temperature. They can then be placed around the article to be packaged or protected and heated to shrink and cling tighly to the article. In such instances, care should be taken to avoid adherence to the article either by selecting a low enough shrinking temperature or by limiting this use to articles which are not bonded by the adhesive compositon. By providing overlapping portion of the film it can be caused to adhere to itself upon heating and thus form a tightly clinging, sealed package.

In tape form, the adhesive compositions containing cyclic ester polymer alone or mixed with poly(vinyl alkyl ether) as described herein, are flexible and strong and have a wide range of uses. Such tapes can be used in the manufacture and repair of garments and other textile fabrics to form the seams, pleats, creases and other shapes in the garment and/or to join two or more segments of the garment, or to repair rips or trears in garments. These tapes of cyclic ester polymer alone or mixed with poly(vinyl alkyl ether) can also be oriented by stretching at room temperature to form heat shrinkable tapes which can be used to repair broken glassware, broken wooden or plastic tool handles, and even objects which do not readily adhere to the adhesive compositions, by using the methods described in Example 4 below. The tape can be wrapped around the broken piece and heated or warmed to the activation temperature and cooled to shrink and bond the tape to the broken piece or to itself, if the tape has been overlapped on itself. In those instances where there is little or no adhesion between the adhesive composition and the broken object, the heat-shrinkable tape can be tightly wound around the object and overlapped on itself and then heated to the shrinking temperature, e.g., 60° to 80° C. or higher, to seal the tape to itself and shrink it up tightly around the object. These tapes may also have either woven or non-woven filaments of a higher use-temperature polymer, e.g., poly(ethylene terephthalate) or fiber glass, to increase the joint strength.

DESCRIPTION OF SPECIFIC EMBODIMENTS

The following examples are presented. Unless otherwise specified, all percentages and parts are by weight, all temperatures are on the Centigrade scale, and all reduced viscosities are measured at a concentration of 0.2 grams of polymer in 100 milliliters of benzene at about 30° C. and Mylar designated poly(ethylene terephthalate).

EXAMPLE 1

A high molecular weight, noninitiated, substantial homopolymer of epsilon-caprolactone (PCL) having a reduced viscosity of 3.2 dl./gm. was blended with poly(vinyl ethyl ether) (PVEE) having a specific gravity of approximately 0.968 and a reduced viscosity of about 5.0 ± 0.5 dl./gm. when measured in benzene at 20° C. and a concentration of about 0.1 gm./100 ml. in various proportions. The homopolymer was prepared by dispersion polymerization in heptane of epsilon-caprolactone using dibutylzinc catalyst and vinyl chloride-lauryl methacrylate copolymer as interfacial agent. The proportions of PCL and PVEE and the physical properties of each blend are given in Table I. The blends were made on a two-roll mill at about 90° C. using conventional techniques. Blendability was good at all ratios.

The blend containing 10 percent polycaprolactone was slightly translucent, a little more rigid than poly(vinyl ethyl ether). The higher PCL blends were noticeably more opaque, stiffer, nontacky to the tough, and did not block or adhere to themselves even after 24 hours or more of pressure contact at room temperature. Based on the data in Table I, the creep resistance of the blends appears to be better than that of poly(vinyl ethyl ether) alone.

TABLE I

| PCL/PVEE (percent) | 0/100 | 10/90 | 30/70 | 50/50 | 70/30 | 100/0 |
|---|---|---|---|---|---|---|
| 1% secant modulus, p.s.i. (stiffness) | 64 | 300 | 1,500 | 7,800 | 17,000 | 20,000 |
| Tensile strength, p.s.i. | 12 | 90 | 350 | 1,300 | 3,400 | 7,800 |
| Elongation, percent | >2,700 | 900 | 940 | 1,200 | 1,500 | 1,200 |

EXAMPLE 2

A low molecular weight (theoretical number average 10,000), butyl carbitol-initiated polymer of epsilon-caprolactone prepared by bulk polymerization with stannous octoate catalyst and having a reduced viscosity of 0.32 dl./g. was blended on a two-roll mill at about 90° C. with the poly(vinyl ethyl ether) (PVEE) described in Example 1, to compare the effect of low molecular weight cyclic ester polymer on the tack of poly(vinyl ethyl ether). The proportions and physical properties of these blends are given in Table II.

TABLE II

| PCL/PVEE (percent) | 0/100 | 10/90 | 30/70 | 50/50 | 70/30 |
|---|---|---|---|---|---|
| 1% secant modulus, p.s.i. | 64 | 70 | 460 | 1,000 | 13,000 |
| Tensile strength, p.s.i. | 12 | 26 | 60 | 85 | 280 |
| Elongation, percent | >2,700 | >2,700 | 1,050 | 160 | 25 |

These blends are similar to visual appearance and tack to the corresponding blends described in Table I, although their physical properties are lower than the corresponding blends of Example 1. It would appear that creep resistance of the blends as compared to PVEE alone is improved but not to the same degree as the corresponding blends of Example 1.

EXAMPLE 3

The blends described in Tables I and II containing 30 percent PCL and 70 percent PVEE were molded into plaques about 20 mils thick. Small pieces of these plaques were placed between glass microscope slides, clamped, and warmed for about 10 minutes in an oven set at various temperatures. When these composite plaques were cooled to room temperature and tested for adhesion, the following results were obtained:

| Room temperature | no adhesion |
| 40°C. | no adhesion |
| 60°C. | good adhesion |
| 80°C. | very good adhesion |

In addition, when two small plaques of these blends were contacted with each other under pressure for 48 hours at room temperature they did not adhere to each other.

These blends of PCL and PVEE are useful as heat sensitive adhesives that do not block at room temperature.

EXAMPLE 4

A blend containing 80 percent of a high molecular weight, noninitiated, substantial homopolymer of epsilon-caprolactone as described in Example 1 and 20 percent of a high molecular weight poly(vinyl ethyl ether) (PVEE) described in Example 1 was prepared on a two-roll mill at about 90° C. This blend was easily oriented by hand at room temperature from a thickness of about 0.006 in. to a thickness of about 0.002 in. to form very useful heat shrinkable, adhesive films. For example a broken glass vial was wrapped with a few windings of such a tape and then warmed. The film shrank about the glass upon warming and, after cooling to room temperature, adhered very well to the glass and to itself within the laps of tape about the glass. The result was a well mended glass object. In another test, an ordinary wood covered pencil was wrapped with the tape and warmed. Again the film shrank about the pencil and, after cooling to room temperature, adhered well to it to form a plastic coated object. When the pencil was sharpened, the coating, except for that portion removed in the sharpener, remained well adhered to the pencil.

Thus, such blends are useful in forming heat shrinkable films that adhere to many substrates. In fact, such tapes are useful for mending objets even if they do not adhere to the object. In these instances, the tape is looped around the object and constrained from falling off. When warmed, the looped tape shrinks and bonds to itself, forming a tough, strong junction. For example, a mesh polyethylene basket that had broken was mended by looping the tape about the broken meshwork of the basket. When warmed the tape shrank and effected a good mend.

Another interesting use of tapes or films of the adhesive composition of this invention in unoriented form is their utility as heat sensitive adhesives for bonding fabrics together (i.e., to form seams without sewing with thread) for a number of textile applications. One example is the forming of seams in paper dresses and other fabrics of natural or synthetic fibers or blends thereof.

A fiber glass-PCL laminate or a filled PCL laminate may be molded to form a three-dimensional cavity mold which can then be used to cast low temperature molding compositons such as plaster of paris and long curing epoxies.

EXAMPLE 5

This example describes the use of a substantial homopolymer of epsilon-caprolactone (PCL) alone and of a blend of a substantial homopolymer of epsilon-caprolactone (PCL) and poly(vinyl ethyl ether) as adhesives for Mylar polyester (ethylene glycol terephthalate polyester) film. The PCL used in both instances was the same as that used in Example 1. A 5 percent methylene chloride solution of the high molecular weight, noninitiated PLC and a methylene chloride solution containing four percent of the same PLC and one percent relatively low molecular weight poly(vinyl ethyl ether) having a specific gravity of about 0.973 and a reduced viscosity of about 0.3 ± 0.1 when measured in benzene at 20° C. and a concentration of about 0.1 gm./100 ml. (80/20 by weight polymer ratio) were prepared.

When each of these solutions was separately cast onto Mylar film, they adhered extremely well. When two strips of such coated Mylar film were dried and placed together in a manner that the PCL-containing coatings were in contact, warmed to about 60°–70° C., pressed together by hand pressure, and cooled to room temperature, excellent bonding took place. In fact, when one attempted to separate the laminate formed with PCL alone, the Mylar tore.

In the case of the blend, the bond was very good but the Mylar strips could be separated without tearing the Mylar. Quick-drying solvents other than methylene chloride can be used. From the above, it is readily apparent that the above-described solutions are good, heat sealable adhesives for Mylar and that they are quite useful in forming film laminates such as poly(vinyl chloride)/PCL/Mylar laminates or poly(vinyl chloride)/PCL-poly(vinyl ethyl ether)/Mylar laminates.

EXAMPLE 6

This example describes the uses of, respectively, a substantial homopolymer of epsilon-caprolactone (PCL) as described in Example 1 and a substantial homopolymer of 2-keto-1,4-dioxane (PKD) made by a dispersion polymerization in heptane using 3.0 percent poly(vinyl stearate) as interfacial agent, tri(isobutyl)aluminum catalyst (percent based on weight of caprolactone) and having a reduced viscosity of 0.84 in o-cresol at 30° C. as adhesives for plywood. Plywood strips 4 inches × 1 inch × ⅜ inch were used. The PCL in powdered form was spread on one of the strips near the end thereof and another strip was placed over the polymer. The strips were then clamped and heated in an oven respectively at 60° C., 80° C. and 100° C. for about 10 minutes. After cooling to room temperature the clamps were removed and an attempt was made to separate the strips by hand. The strips heated at 60° C. were easily pulled apart. The strips heated at 80° C. and at 100° C. were bonded very well and the wood broke rather than the polymeric bond when separation was attempted.

Two coats of a five percent methylene chloride solution of the PCL were placed on two plywood strips near the ends thereof. When the coatings became tacky by evaporation of solvent, the strips were clamped together, heated in an oven respectively at 60° C., 80° C. and 100° C. for about 10 minutes, and cooled to room temperature. In all cases, very good adhesion resulted and, in each case, plywood failed rather than the PCL polymeric bond.

In a similar manner, PKD was used. This polymer has a higher melting point than PCL and thus should have a greater service range. In this case the clamped specimens were heated to 130° C. for about 15 minutes. The polymer provides very good adhesion of the plywood. Once again, when tested the wood failed rather than the PKD polymeric bond.

This example illustrates the use of the adhesive compositions of this invention for plywood. These compositions also can be used to bond Mylar to plywood and as a paint for plywood.

EXAMPLE 7

Small amounts of various dyes, namely, DuPont Rhodamine B, DuPont Brilliant Green, and DuPont Victoria Blue, were added to methylene chloride solutions containing five percent of the substantial homopolymer of epsilon-caprolactone as described in Example 1 to form ink compositions. These inks were used to write in color on 3-M brand, Type 127, Mylar, projection positives. After drying, it was found that the inks had very good adhesion to the substrate. When the slide was projected, the writing was projected in color. Such compositions are useful as inks that allow, for example, a lecturer to write or to mark in color on various substrates and allow color printing on a wide variety of substrates.

EXAMPLE 8

The procedures of Example 6 were repeated using paper coated plasterboard instead of plywood. In this instance also the substrate failed and the polymer did not.

EXAMPLE 9

Several solutions were prepared by dissolving two substantial homopolymers of epsilon-caprolactone of different molecular weights in 2-nitropropane in the respective amounts shown in Table III below. A dye, DuPont Victoria Pure Blue BO was added in the amounts shown to the two cyclic ester polymer solutions shown. Also, titanium dioxide pigment in the amount shown was added to the solutions designated in Table III. The cyclic ester polymers used were made by dispersion polymerization using vinyl chloride/lauryl methacrylate copolymers as interfacial agent and an anionic catalyst, such as tri(isobutyl)aluminum. The reduced viscosity of one polymer (PCL-1) was 0.6 and the reduced viscosity of the other polymer (PCL-2) was 1.34.

Ink film properties of each resulting ink were determined by coating each ink on the various substrates listed in the table by a roller coater and these properties are also listed in Table III.

pared in the same manner as PCL-3 except that 406 ppm water was used instead of 650 ppm and the resulting product had a reduced viscosity of 0.98.

A cyclic ester polymer designated PCL-5 was prepared by dispersion polymerization in heptane of epsilon-caprolactone using about 5 percent poly(vinyl stearate) as interfacial agent and 0.3 percent tri(isobutyl)aluminum (percentages based on weight of caprolactone) at about 90° C. for a period of about 1 hour to about 4 hours. The resulting product was extruded and pelletized to provide a polymer designaged PCL-5 having a reduced viscosity of 1.52.

Films of PCL-3, PCL-4 and PCL-5 are prepared by compression molding the respective polymer in a press to obtain a film ranging in thickness from 10 to 20 mils. The resulting films are placed between two substrates to be adhered as identified in part B of Table IV. These laminates are bonded at the indicated temperatures, pressures and periods of time shown in Table IV and the adhesion values also shown there are obtained.

The adhesion values are obtained according to a modification of test ASTM-D-1876-61T wherein the crosshead speed of the testing device is changed to 2 inches per minute. In these examples the testing device is attached to the substrates with the PCL as the inner core. Thus, a peel value or strength of adhesion of substrate to PCL to substrate at essentially a 90° angle is obtained.

For those substrates which were too rigid to provide

TABLE III

| | Dye inks | | Pigmented inks | | | |
|---|---|---|---|---|---|---|
| | PCL-1 | PCL-2 | PCL-1 | PCL-1 | PCL-2 | PCL-2 |
| Ink properties: | | | | | | |
| PCL used (reduced viscosity) | (0.6) | (1.34) | (0.6) | (0.6) | (1.34) | (1.34). |
| Total solids, percent | 20 | 11.0 | 32.2 | 32.8 | 19.8 | 19.7. |
| Dye or pigment, percent of total solids | 10 [1] | 10 [1] | 50 [2] | 61 [2] | 50 [2] | 61.[2] |
| Ink film properties: | | | | | | |
| Mar resistance | Good | Good | Fair | Fair | Fair | Fair. |
| Flexibility | Excellent | Excellent | Excellent | Good | Excellent | Good. |
| Ahesion to: | | | | | | |
| Uncoated cellophane | do | Good+ | Poor | Poor | Poor | Poor. |
| Nitrocellulose coated cellophane | do | Excellent | Excellent | Excellent | Excellent | Excellent. |
| Polyvinylidene chloride coated cellophane | do | do | do | do | do | Do. |
| Mylar | Good | do | Excellent | Fair+ | do | Do. |
| Shellac washed Al foil | Excellent | do | do | Good | do | Do. |
| Glassine paper | do | do | Good | Fair | Fair | Poor. |
| Cast coated paper | Good | do | Poor | | Excellent | |
| Gloss | Excellent | Excellent | Good+ | Poor | Good | Do. |
| Boiling water resistance | Poor | Poor | Excellent | | Excellent | |
| Ice water resistance | Excellent | Excellent | do | | do | |
| Block resistance | do | do | | Excellent | | Excellent. |

[1] DuPont Victoria Pure Blue BO.
[2] TiO₂.

EXAMPLE 10

Four cyclic ester polymers were tested in this example as adhesives for various substrates.

A cyclic ester polymer, hereinafter designated PCL-3, was prepared by bulk polymerization of epsilon-caprolactone in the presence of 650 ppm water and 0.2 percent stannous octoate (parts and percentages based on weight of caprolactone) at a temperature of 150° C. for a period of 3 to 5 hours. After a period of about 2 hours, the temperature was increased to 180° C. to complete the polymerization at a decreased melt viscosity. The polymeric product had a reduced vsicosity of 0.65.

A cyclic ester polymer designated PCL-4 was prea testing angle close to 90° during the adhesive testing study, a bond beween a portion of the PCL film and a single layer of rigid substrate is formed, under conditions indicated in Table IV, part A, thus providing an unbonded tab of PCL. In this part of the study, the peel values are conveniently obtained by attaching the rigid substrate to one part of the testing device and attaching the flexible and unbonded PCL tab to the other part of the testing device. Thes testing of these PCL-substrate bonds is then effected at a peel angle of 90° formed by the PCL tab. The results are listed in part A of Table IV.

Where the substrates are flexible as in part B of Table IV each substrate is attached to the testing device as explained above.

TABLE IV

| | Bonding parameters | | | Adhesion | | |
|---|---|---|---|---|---|---|
| Substrate | T., ° C. | P.s.i. | Time, min. | PCL-3 | PCL-4 | PCL-5 |
| A: | | | | | | |
| Impact polystyrene [1] | 150 | 40 | 2 | Excellent | | |
| Acrylonitrile-butadiene-styrene copolymer [2] | 150 | 80 | 2 | do | Excellent | |
| Polyurethane [3] | 185 | 20 | 2 | do | Fair | |

Table IV — Continued

| Substrate | Bonding parameters | | | Adhesion | | |
|---|---|---|---|---|---|---|
| | T., °C. | P.s.i. | Time, min. | PCL-3 | PCL-4 | PCL-5 |
| Glass-reinforced epoxy board | 150 | 20 | 2 | do | Excellent | |
| Wood—Douglas fir plywood 3/8" | 180 | 20 | 3 | Excellent (wood failure) | | |
| Polystyrene [4] | 180 | 20 | 2 | Excellent | Excellent | |
| Glass | 200 | 1 | 15 | do | | |
| B: | | | | | | |
| Poly(ethylene terephthalate) (2 mils) | 195 | 40 | 1 | Poor | Good | Excellent. |
| Paperboard stock | 100 | 10 | 1 | Excellent | | |
| Al metal 10 mil (al-al) | 180 | 15 | 3 | Poor | Fair | |

Footnotes:
1. A styrene grafted polybutadine copolymer which is commercially available containing about 9 percent of the polybutadiene component, possessing a specific gravity of 1.04 (ASTM-D792), a softening point of 195° F. (ASTM-D1525)and possessing an Izod impact strength at 73° F. of 1.40 (ASTM-D256).
2. A thermoplastic prepared by grafting a mixture of acrylonitrile and styrene (about 30 parts acrylonitrile and 70 parts styrene) on polybutadiene (or an acrylonitrile butadiene rubber) to yield a product with an acrylonitrile content in the range of 20 to 45 percent. The material used possesses a specific gravity of 1.05, an Izode impact strength of 2.9 (ASTM-D256) and a heat distortion temperature at 264 psi of 185° F. (ASTM-D648).
3. A commercially available product prepared by the reaction of a low molecular weight poly(butanediol adipate) with molecular weight in the range of 2,000 to 3,000 with a diisocyanate to yied a high molecular weight (35,000 –50,000) polyurethane. The diisocyanate is diphenylmethane diisocyanate. The polymer possesses a specific gravity of 1.23.
4. An unfilled (transparent) homopolymer of polystyrene prepared via bulk polymerization to yeild a polymer with a molecular weight in excess of 50,000 and a specific gravity of 1.05.

EXAMPLE 11

Employing the procedure of Example 10, poly(ethylene terephthalate) (Mylar) film is bonded to each of styrene film, paperboard and a film of acrylonitrile-butadiene-styrene copolymer using, in separate instances, PCL 3, PCL-4 and PCL-5 films sandwiched between the Mylar film and each of the other above-named films. The resulting composite articles are heated to about 195° C. with the exception of the paperboard composite article which is heated to about 100° C. While at this temperature the composite articles are pressed together under a pressure of about 80 psi for about 2 minutes. Each composite article shows excellent adhesion of all layers, in every instance.

EXAMPLE 12

A film of polyurethane and a film of acrylonitrile-butadiene-styrene copolymer are bonded together by films of PCL-3, PCL-4 and PCL-5 in the manner described in Example 10 by sandwiching of the PCL films between the other two films mentioned. The resulting composite articles are pressed together under a pressure of about 80 psi at a temperature of 150° C. for about 2 minutes. All composite articles exhibit excellent adhesion of all layers.

EXAMPLE 13

Chipboard paper stock is coated with a hot melt (about 120° C.) of, respectively, PCL-3, PCL-4 and PCL-5 as identified in Example 10 and allowed to cool. The resulting PCL films all show good adhesion to the chipboard paper stock and crease and folding resistance of the coated stock is excellent especially for the higher molecular weight polymers.

Thereafter, a film of poly(ethylene terephthalate) is pressed onto the coated paper stock and heated (about 120° C.) to form a laminate in which the chipboard paper stock adheres very well to the poly(ethylene therephthalate) film upon cooling to room temperature. In addition, a sheet of polystyrene is pressed onto the coated stock and heated (about 120° C.) to laminate it to the stock. The polystyrene sheet also adheres very well to the paper stock upon cooling to room temeprature.

Substantially similar results are obtained as in respectively Examples 3 through 7 and 9 through 13 when the substantial homopolymers of and copolymers of two or more of the following cyclic esters are respectively substituted for the epsilon-caprolactone polymer in each of these examples: delta-valerolactone, zeta-enantholactone, etacaprylolactone, monomethyl-delta-valerolactone, monohexyl-deltavalerolactone, tri-n-propyl-epsilon-caprolactone, monomethoxy-deltavalerolactone, diethoxy-delta-valerolactone, diethyl-epsilon-caprolactone and monoisopropoxy-epsilon-caprolactone.

We claim:
1. A laminated article comprising at least one solid substrate from the class consisting of glass, leather, cellulosic solids, polyamide solids, polyurethane solids, natural rubber, synthetic rubber, phenolic resins, epoxy resins, polycarbonates, polyesters of polycarboxylic acids and polyhydric alcohols, polysulfones, and styrene polymers and copolymers bonded to a cyclic ester polymer having a reduced viscosity of about 0.3 to about 15 and having at least a major molar amount of recurring units of the formula:

(I) 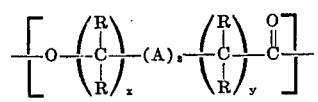

wherein each R, individually, is selected from the class consisting of hydrogen, alkyl, halo, and alkoxy; A is the oxy group; $x$ is an integer from 1 to 4; $y$ is an integer from 1 to 4; $z$ is an integer of zero or one; with the provisos that (a) the sum of $x + y + z$ is at least 4 and not greater than 7, and (b) the total number of R variables which are substituents other than hydrogen does not exceed 3, and 0 to a minor molar amount of recurring units of the formula:

(II) 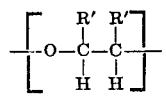

wherein each R' is selected from the class consisting of, individually, hydrogen, alkyl, cycloalkyl, aryl, and chloroalkyl and, together with the ethylene moiety of the oxyethylene chain of Unit II, a saturated cycloaliphatic hydrocarbon ring having from 4 to 8 carbon atoms.

2. A laminated article as claimed in claim 3 wherein said cyclic ester polymer is a substantial homopolymer of epsilon-caprolactone.

3. A laminated article as claimed in claim 1 wherein two substrates are bonded together by said cyclic ester polymer.

4. A laminated article as claimed in claim 3 wherein said substrates are glass.

5. A laminated article as claimed in claim 3 wherein one substrate is poly(ethylene terephthalate) and the other is a cellulosic sold.

6. A laminated article comprising at least one solid substrate and adhered thereto a film comprising about 10 to about 90 weight percent of poly(vinyl alkyl ether) and about 90 to about 10 weight percent of a cyclic ester polymer, based on the total weight of poly(vinyl alkyl ether) and cyclic ester polymer, having a reduced viscosity of about 0.3 to about 15 and having at least a major amount of recurring structural units of the formula:

(I)

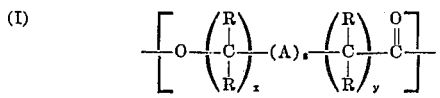

wherein each R, individually, is selected from the class consisting of hydrogen, alkyl, halo, and alkoxy; A is the oxy group; $x$ is an integer from 1 to 4; $y$ is an integer from 1 to 4; $z$ is an integer of zero or one; with the provisos that (a) the sum of $x + y + z$ is at least 4 and not greater than 7, and (b) the total number of R variable which are substituents other than hydrogen does not exceed 3; and up to a minor molar amount of recurring structural units of the formula:

(II)

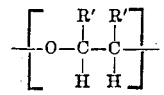

wherein each R' is selected from the class consisting of, individually, hydrogen, alkyl, cycloalkyl, aryl, and chloro-alkyl, and, together with the ethylene moiety of the oxyethylene chain of Unit II, a saturated cycloaliphatic hydrocarbon ring having 4 to 8 carbon atoms.

7. A laminated article as claimed in claim 1 wherein the cyclic ester polymer is a substantial homopolymer of epsilon-caprolactone.

8. A laminated article as claimed in claim 1 wherein said units II are oxyethylene units.

9. A laminated article as claimed in claim 5 wherein said substrate is glass.

10. A laminated article as claimed in claim 5 wherein said substrate is wood.

11. A laminated article as claimed in claim 5 wherein said substrate is poly(ethylene terephthalate).

12. A laminated article as claimed in claim 5 wherein said substrate is a cellulosic solid.

13. A laminated article as claimed in claim 5 wherein said substrate is a styrene polymer.

14. A laminated article as claimed in claim 5 wherein said substrate is epoxy resin.

* * * * *

PO-1050
(5/69)

UNITED STATES PATENT OFFICE
CERTIFICATE OF CORRECTION

Patent No. 3,770,564      Dated November 6, 1973

Inventor(s) Joseph Victor Koleske, Robert Dean Lundberg, Dale Flavian Pollart, and Walter Henry Smarook It is certified that error appears in the above-identified patent and that said Letters Patent are hereby corrected as shown below:

Column 17, line 6, "3" should read --1--.

Column 18, line 16, "1" should read --6--.

Column 18, line 19, "1" should read --6--.

Column 18, line 21, "5" should read --8--.

Column 18, line 23, "5" should read --8--.

Column 18, line 25, "5" should read --8--.

Column 18, line 27, "5" should read --8--.

Column 18, line 29, "5" should read --8--.

Column 18, line 31, "5" should read --8--.

Signed and sealed this 23rd day of April 1974.

(SEAL)
Attest:

EDWARD M. FLETCHER, JR.
Attesting Officer

C. MARSHALL DANN
Commissioner of Patents